June 18, 1968  G. D. RAYNO  3,389,311
SEALED CAPACITOR AND METHOD OF SEALING THEREOF
Filed Nov. 18, 1966
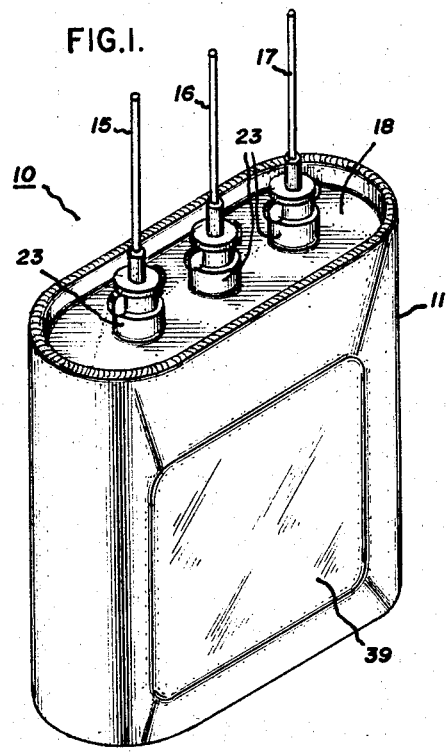
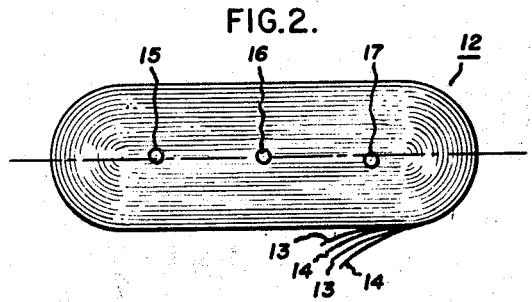
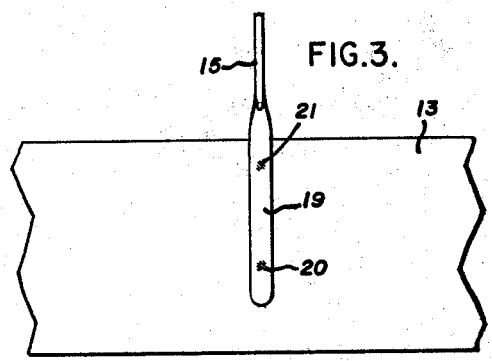
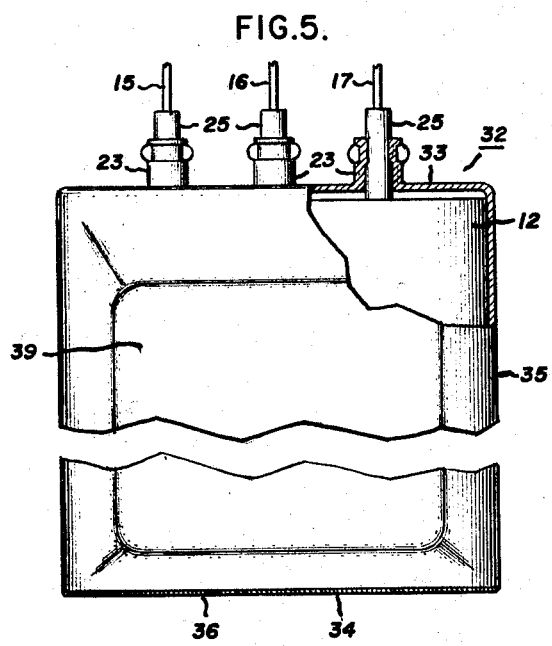
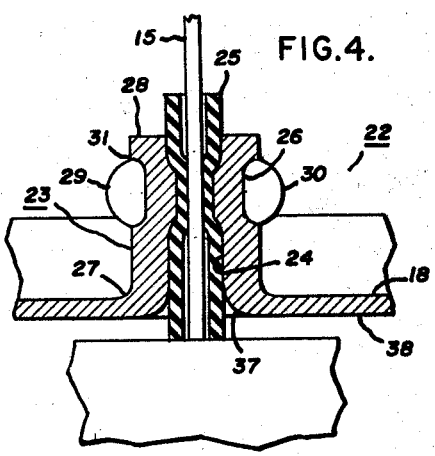
INVENTOR:
GLENN D. RAYNO,
BY
HIS ATTORNEY.

United States Patent Office 3,389,311
SEALED CAPACITOR AND METHOD OF
SEALING THEREOF
Glenn D. Rayno, Glens Falls, N.Y., assignor to General
Electric Company, a corporation of New York
Filed Nov. 18, 1966, Ser. No. 595,436
10 Claims. (Cl. 317—256)

This invention relates to sealed capacitors and more particularly to dielectric liquid impregnated capacitors having end wall means incorporating a crimped metal-elastomer seal arrangement for electrical conductor leads passing therethrough.

A large number of different kinds of capacitors, and capacitors of different configurations are available for electronic and electrical circuits generally. One exemplary capacitor in accordance with this invention is referred to as a can type capacitor. A can type capacitor includes a metal can, casing, or housing, enclosing a convoluted capacitor element, usually a composite of alternate layers or strips of a dielectric material and an electrical conductor. The capacitor element is ordinarily impregnated by a dielectric liquid impregnant, and in many instances some excess liquid impregnant is retained within the can. This can configuration utilizing a dielectric liquid impregnant involves the necessity of a proper liquid-tight seal for the can which is economical, and effective under adverse operative conditions.

Since liquid dielectric impregnation is usually carried on after the capacitor element is inserted in the can, proper sealing must take place after assembly of the capacitor, and both a seal and electrical insulation must be provided at those locations where electrical leads pass through the can for external connection. Because of the inherent fragility of the attachment of electrical leads to thin metal foil in the capacitor element, the assembly operation and the sealing operation must be performed with extreme care to avoid damage. For this included reason, many prior art capacitors utilize a separate electrical lead connecting the capacitor element to a separate internal terminal in the can or on a cover, and electrical connection is made to the capacitor through external terminal structure connecting to the internal terminal.

Accordingly, it is an object of this invention to provide an improved capacitor seal.

It is a further object of this invention to provide an improved crimped metal-dielectric seal for a liquid impregnated capacitor.

It is another object of this invention to provide an improved coaxial electrode-elastomer seal in an extruded and crimped portion of a metal can capacitor with the electrode passing through the can.

It is another object of this invention to provide a coaxial thick-walled tubular metal protrusion and a thin wall elastomer tube therein for crimp sealing in liquid-tight relationship an electrode passing through the tubing.

It is still another object of this invention to provide an improved continuous electrical lead crimped metal-elastomer seal cover assembly for a liquid dielectric capacitor.

It is another object of this invention to provide a crimped metal-elastomer seal on a capacitor can to seal projecting leads thereto where said elastomer comprises an electrical resistance of predetermined value.

It is yet another object of this invention to provide a metal cover member having at least three spaced co-linear projections thereon for crimped metal-elastomer sealing a continuous lead through each.

Briefly described, this invention in one of its preferred forms includes a dielectric liquid impregnated convoluted capacitor element positioned in a metal can, for example, aluminum. A separate aluminum cover member is sealed to the can and contains a central linear row of three generally cylindrical aperture defining thick walled tubular protrusions or nipples extending away from the can. A continuous electrical conductor in the form of a wire, for example, is flattened at one end and welded to a metal foil conductor in the capacitor convolute element. This wire lead is continuous and passes concentrically through a thin walled elastomer sleeve or tube in the cover protrusion externally of the can. The protrusion is then circumferentially crimped or swaged about the elastomer and wire lead to a predetermined degree for sealing the lead in the can in liquid-tight relationship.

This invention will be better understood when taken in connection with the following description in which:

FIGURE 1 is an isometric view of one preferred embodiment of this invention illustrating a cover assembly with capacitor leads extending through crimp sealed protrusions;

FIGURE 2 is a top view of a capacitor section illustrating the generally linear row of wire leads connected thereto;

FIGURE 3 is an illustration of a preferred continuous wire lead conductor including a flattened section welded to a foil conductor of the capacitor element;

FIGURE 4 is a side elevation and partial cross-sectional enlarged view of the cover assembly of this invention detailing one protrusion;

FIGURE 5 is a modification of the invention of FIGURE 1 illustrating wire leads projecting through an integral can wall portion.

Referring now to FIGURE 1 there is illustrated a capacitor 10 which may be of the same type as described in U.S. Patents 2,370,488 Clark and 2,864,982 Ruscetta, each assigned to the same assignee as the present invention. For example, capacitor 10 comprises, preferably, a metal can 11, for example an extruded aluminum can, which contains a capacitor element 12 therein as illustrated in FIGURE 2. In FIGURE 2, capacitor element 12 comprises a convolute of alternate strips of a conductor 13, usually a metal foil, and dielectric 14, usually a paper or plastic material. For the purpose of clarity these strips 13 and 14 in FIGURE 2 are shown partly unrolled. Element 12 is provided with suitable electrical conductors or leads 15, 16 and 17 which are attached to foil conductor 13 and extend through a separator metal cover 18, also for example of aluminum. Capacitor element 12 is usually impregnated with a liquid dielectric and consequently can 11 is required to be sealed not only at any liquid dielectric filling aperture which might be employed, but also at those locations where the electrical conductor leads pass through the can to connect to the capacitor element. Recessed type cover 18 is suitably sealed, preferably by welding along the top periphery as illustrated in FIGURE 1. Two conductors are employed for a single section capacitor and three or more conductors for a capacitor element having two or more capacitor sections of different capacitance rating.

An important feature of this invention is the use of a specific crimped metal-elastomer seal for electrical leads passing into the can 11 for connection to capacitor element 12. The use of the crimped metal-elastomer seal of this invention in cover 18 for leads 15, 16 and 17, not only provides for the use of single straight and continuous leads, but also is compatible with a preferred weld attachment (as opposed to mechanical joining) of straight continuous leads to the foil conductor 13 passing through cover 18.

The use of a straight continuous lead is advantageous in this invention. Ordinarily a lead from a capacitor element foil conductor is attached to element 12 near the periphery thereof and is therefore brought out at an angle to the underside of the cover 18 where it is joined to a separate terminal structure extending centrally through the cover. The other or external side of the terminal structure is usually a tab arrangement on the cover suitably formed form attachment to whatever further circuitry lead is involved. One of the reasons for having the angled and two part or discontinuous lead relates to the fragile nature of the lead (15, 16 or 17) connection to the foil 13 conductor which often cannot withstand the forces and temperatures utilized to weld or solder cover member 18 in place, or the forces present during assembly manipulations and manipulations necessary to seal the leads in cover 18.

A welding type connection may be suitably employed to attach the leads of this invention to the respective foil conductors. An exemplary weld arrangement for leads 15, 16 and 17 is shown in FIGURE 3. Referring now to FIGURE 3 there is illustrated a wire lead conductor such as lead 15 which in one preferred embodiment of this invention is of 0.025 inch diameter tinned copper wire, and a foil conductor 13 which may be of aluminum. Lead 15 includes a flattened portion 19 at one end thereof which lies adjacent foil conductor 13 with the flattened portion extending upwardly beyond one edge of conductor 13. The flattened portion 19 is spot resistance welded to foil 13 at 20 and 21. Lead 15 is continuous in that it is a single, one part lead extending from its welded attachment to foil 13 through cover 18, in which it is sealed by crimped metal-elastomer sealing means 22 (FIGURES 1, 4 and 5).

Sealing means 22 is effective to provide proper sealing of lead in cover 18 with minimal detrimental relative forces between the lead 15 and cover 18, the cover 18 and the capacitor element 12, and between the can 11 and cover 18. Sealing means 22 is best described with respect to FIGURE 4. Referring now to FIGURE 4, sealing means 22 includes a thick walled nipple or protrusion 23 in cover 18 defining a central axially aperture 24 through which a lead such as lead 15 passes. A thin walled dielectric material sleeve or bushing 25 of an elastomer material such as silicone rubber for example is fitted over lead 15 to be positioned concentrically with lead 15 and coaxially between lead 15 and protrusion 23. In a preferred embodiment of this invention the original outside diameter of sleeve 25 is smaller than the diameter of aperture 24. Thereafter a predetermined axial section or length of the protrusion 23 is circumferentially compressed over the greater part of its periphery to compressively engage the deform sleeve 25 to a predetermined degree, and effect a liquid-tight seal between lead 15 and protrusion 23. Sleeve 25 may also be a dielectric material elastomer like coating on leads 15, 16 and 17 to provide the same function as the elastomer tube.

Sealing forces and materials must be correlated with respect to seal tightness, temperature differentials, and other forces tending to weaken the seal. In one working embodiment of this invention leads 15, 16 and 17 were 0.025 inch diameter tinned copper wire, and sleeve 25 was silicone rubber fo about 0.078 inch outside diameter and about 0.033 inch inside diameter. Protrusion 23 was originally about 0.188 inch outside diameter and about 0.094 inch inside diameter.

Crimping was provided by engaging protrusions 23 between oppositely directed arcuate or C section anvils, whose engaging periphery is smaller than the periphery of protrusion 23, and compressing and extruding protrusion 23 to provide a neck or indentation 26. This neck or indentation 26 as illustrated in FIGURE 4, took place over an intermediate length of protrusion 23 between its base 27 and free end 28 extending coextensively therealong about 0.10 inch. The lower end of indentation 26 was spaced from about 0.110 inch to about 0.130 inch from base 27 and about 0.030 inch from free end 28. Some variation in these values may be tolerated commensurate with the kind of seal desired.

In the crimp sealing operation the crimped periphery of protrusion 23 is reduced diametrically to about 0.153 inch. Some of the metal involved in crimping is extruded by the engaging anvils and results in diametrically opposed thin metal ears 29 and 30. Also the crimping operation being preferably limited to an intermediate portion of the protrusion 23 defines a lip, rim, on bead 31 at free end 27. This lip 31 may be suitably employed as fastener means for a further protective cover or insulator to be attached to capacitor can 11. It is preferred that the sealing process provide continuous neck sealing, i.e., indentation sealing which peripherally or circumferentially surrounds the protrusion in essentially a continuous manner. The continuous circumferential reduced section or neck is only interrupted at diametrically opposed locations by the thin metal ears 29 and 30, and these ears do not detract from the feature that the sleeve is essentially totally circumferentially compressed, and axially extruded as there are no radial voids ot fill. Furthermore, the sleeve wall thickness is correlated to the restraining compressive force so that the resilient or elastic opposing force of the sleeve 25 material is within sealing limitation and the material is sufficiently compressed for liquid impregnation sealing.

The foregoing seal dimensions have been found to be particularly effective in liquid dielectric impregnated capacitors of about 300 to about 600 volt ratings where can 11 is generally of an oval-like cross section of rectangular elevation whose dimensions are about 2.0 inch width, 2¼ inch height, 1¼ inches deep and of about 0.025 inch wall thickness. The degree of compression of both the aluminum and a silicone rubber sleeve 25, and the area of compression and amount of metal involved in the compression area are effective particularly with the mentioned capacitors utilizing a Pyranol[1] liquid dielectric material. This liquid dielectric which is a halogenated hydrocarbon, for example, trichlordiphenyl, as more fully described in U.S. Patents 3,242,402 Stahr et al. and 2,041,594 Clark each assigned to the same assignee as the present invention is readily absorbed by many elastomers which are desirable for use as sleeve 25, including silicone rubber. When absorption takes place, asphalt material which is often employed in adjacent areas is transmitted through the liquid impregnant into the capacitor with deleterious results. The described constructing type seal has been found to minimize liquid leakage or transmission of asphalt into the capacitor.

Protrusions 23 are generally employed in a wall portion of a can or housing, usually a transverse end wall. The wall portion in some instances need not be formed in a separate cover or panel but may be formed in an integral wall of a can such as can 11 or a similar type can. For example, referring to FIGURE 5 there is shown a modified capacitor 32 wherein protrusions 23 are formed in an integral top wall 33. Other than wall location, the discussion of the protrusion 23 features of FIGURES 1 through 4 apply to FIGURE 5. The opposite end or bottom wall 34 of capacitor 32 may be in the form of a separate cover suitably attached to the can body 35, or, can 35 may be compressed along the bottom edge with some flaring to provide a linear seam weld or seal 36.

The use of an elastomer material for sleeve 25 is particularly advantageous for electrical resistance purposes. For example, a rubber material may be prepared with certain additives such as powdered metals, carbon and graphite included to provide the rubber material with a predetermined electrical resistance. See, for example, U.S. Patent 2,081,517 Van Hoffen. In one form of this invention finely divided graphite may be added to silicone rubber sleeve 25 material to provide an electrical resistance sufficient to discharge capacitors of 300 v. to 500 v. ratings in a short period of time after charging, this short period being a predetermined period substan-

[1] Registered trademark of General Electric Company.

tially shorter than that in which the capacitor would discharge without the use of a resistance or partially conducting sleeve.

The described features of this invention are particularly advantageous in the assembling operation of capacitor 10 and provide for the order of the steps involved. In a preferred assembly operation, the first major assembly step is placing cover 18 on capacitor element 12. The protrusions 23 are formed (FIGURE 4) with a larger bell mouth or flared entry portion 37 adjacent the undersurface 38 of cover 18 to provide ease of insertion of leads 15, 16 and 17 and tolerance of some misalignment of leads 15, 16 and 17. As illustrated in FIGURE 2, leads 15, 16 and 17 are welded to their proper foil strips and the element 12 is rolled so that leads 15, 16 and 17 are very close to the major axis of the roll section and thus approximate a straight linear row. Each lead is approximately in line with each protrusion 23 also in a linear row, when cover 18 is assembled to can 11, preferably in this invention by welding. Leads 15, 16 and 17 together with their flattened sections constitute the well known capacitor taps for this invention. Tap spacing tolerance is provided by placing all taps at or near the center of the convolute element 12 by attaching them near the ends of the individual foil strips before winding. This arrangement obviates the former angled or bent tab arrangement under cover 18, separate leads and much difficulty in assembling methods.

After cover 18 is placed over leads 15, 16 and 17 and on element 12, element 12 is inserted in can 11. This insertion is easily accomplished since in many instances can 11 may be much larger than capacitor element 12, for example, according to the arrangement disclosed in copending application Ser. No. 363,427 Rayno et al. filed Apr. 29, 1964, and assigned to the same assignee as the present invention, now U.S. patent 3,299,333. The disclosed arrangement in the mentioned copending application comprises compressing opposed panel section, 29 and 39' (not shown) FIGURE 1, towards each other in compressionally and fixedly engage the capacitor element 12 therebetween. However, the cover 18 in either this or the mentioned application is fitted to can 11 and welded prior to panel formation by compressing. Cover 18 may also be roll rim sealed to can 11.

At this point in the assembling procedure, elastomer sleeves 25 are placed over leads 15, 16 and 17 and in protrusions 23 and the capacitor 10 is ready for the liquid impregnation process. Assembly of the sleeves is notably facilitated since they are smaller in diameter than aperture 24 and are therefore easily inserted therein. Because of the predetermined relatively large clearance between sleeves 25, the wire leads 15, 16 and 17, and the inside diameter of protrusions 23, can 11 may be filled by a submersion process only and no other filling or draining aperture is necessary. The former fill and drain aperture found in cover 18 and the soldering operation to seal these apertures are eliminated by this invention.

Accordingly, the assembled capacitor without the liquid dielectric impregnant is baked in air, particularly where paper is employed in element 12 for as much as about 4 hours at an elevated temperature as high as about 170° C. Thereafter capacitor 10 is subjected to a low pressure evacuation process, at about 200 microns pressure, and then submerged in a liquid dielectric for impregnation. After submersion capacitor 10 is permitted to soak for a few hours, drained, and the crimp sealing process is applied to provide the seal 22 as illustrated in FIGURE 4.

In the assembly of the FIGURE 5 modification of this invention, where protrusions 23 are extruded from a transverse integral wall portion of a can 11, a long thin stiff tube is placed over each lead 15, 16 and 17 on element 12. These tubes, referred to as guide tubes, are then aligned with and inserted into protrusions 23. With the tubes and capacitor element 12 retained in fixed position the can 11 is caused to slide along the tubes over element 12, and the tubes are then withdrawn. Thereafter the bottom 34 is fitted with a cover which is welded thereto, or the end 34 flattened and seam welded as illustrated in FIGURE 5. The panel 39 compression, dielectric liquid impregnation, and sealing follow in the previous manner as described.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A capacitor comprising in combination:
   (a) a metal can member having open and closed ends
   (b) a liquid dielectric impregnated capacitor element in said can
   (c) a cover member sealed to said open end to provide a liquid tight seal therewith
   (d) a relatively straight continuous electrical lead passing through said cover into said can and substantially straightly into and electrically contacting said element
   (e) and sealing means sealing said conductor in said cover in liquid impregnant tight relationship
   (f) said sealing means comprising:
      (1) plural protrusions on said cover member and extending away from said can
      (2) said protrusion each defining a thick walled aperture into said can, said protrusion defined apertures constituting the sole apertures into said can for liquid impregnation of said capacitor element
      (3) said leads passing through said protrusion apertures
      (4) a thin wall elastomer material sleeve surrounding said leads in said protrusion for electrical insulation thereof said sleeves having an original outside diameter smaller than the inside diameter of said aperture, and an original wall thickness less than the thickness of the walls of said aperture
      (5) and continuous circumferential indentation means extending substantially the total circumference of said protrusion intermediate the length thereof to compressionally engage said elastomer material seal and to provide a liquid impregnant tight seal for said lead.

2. The invention as recited in claim 1 wherein said elastomer material includes an electrically conductive material therein to provide said elastomer material with an electrical resistance sufficient to discharge said capacitor in a predetermined short period of time.

3. A capacitor comprising in combination:
   (a) an aluminum can having a generally oval cross section and generally rectangular elevation
   (b) said can having a separate oval aluminum cover means sealed thereto by welding
   (c) a straight linear row of protrusions extending from said cover away from said capacitor
   (d) each said protrusion defining a thick walled central aperture leading into said can
   (e) a dielectric liquid impregnated convolute capacitor element in said can comprising a wound roll of alternate strips of a metal foil conductor and a dielectric
   (f) plural relatively straight electrical lead wires joined to said foil strips in a substantially straight line along the major axis of said convolute from within said convolute through said aperture
   (g) said joining comprising a flattened section of said wire spot welded to said foil (h) each of said leads being continuous from said welded juncture directly through one of said protrusions externally of said casing with said protrusions being in alignment with said leads when said cover is assembled to said can (i) a silicone rubber sleeve surrounding each said wire in said protrusions, said sleeve having an outside diameter less than the diameter of said central aperture and a wall thickness less than the wall thickness of said protrusions (j) circumferential indentation means extending substantially the total distance about each said protrusions to compressionally engage said sleeve and liquid-tight seal said wire in said protrusion (k) said circumferential indentation means comprising a reduced diameter section of said protrusion having an axial length intermediate the length of said protrusion (l) said reduced section comprising a pair of oppositely directed esmi-circular sections separated by diametrically opposed thin metal ears of extruded metal from said protrusion.

4. A capacitor comprising in combination:
(a) a can member having an opposite open and in integral transverse closed end wall
(b) a dielectric liquid impregnated capacitor element in said can
(c) said cloesd end wall having thick walled protrusions extending outwardly therefrom and each defining an aperture into said can
(d) said open end being compressed in lip form and sealed along a straight line
(e) an electrical lead wire passing through each said aperture for electrical connection to said capacitor element
(f) an elastomer material sleeve surrounding each said lead and electrically insulating said lead from said protrusion, said sleeve having an outside diameter smaller than said aperture and a wall thickness less than the wall thickness of said protrusion
(g) indentation means in each said protrusion intermediate the axial length of said protrusion and extending continuously circumferentially over substantially the total circumference of said protrusion to seal said lead in said can in liquid-tight relationship.

5. The invention as recited in claim 4 wherein said elastomer has a predetermined electrical resistance to provide controlled and scheduled discharge of said capacitor.

6. A method of assembling a capacitor having a capacitor element sealed in a can with leads extending therefrom comprising:
(a) forming a convolute capacitor element having at least a pair of electrical leads extending therefrom
(b) placing a cover member having thick walled protrusions thereon defining central apertures, on said convolute so that said leads pass through said apertures (c) placing said convolute element in said can
(d) sealing said cover to said can
(e) placing a thin wall elastomer material sleeve over said leads and in said central apertures to electrically insulate said lead from said cover
(f) said apertures comprising the sole openings into said can
(g) introducing a liquid dielectric impregnant into said can through said apertures to impregnate said capacitor element
(h) and sealing said can in liquid-tight relationship by forming a circumferential indentation about said protrusions to compressionally engage said elastomer material.

7. The invention as recited in claim 6 including the step of spot welding said leads to said foil prior to forming the convolute.

8. The invention as recited in claim 7 wherein the step is included of submerging said can in said dielectric liquid to impregnate said capacitor element.

9. The invention as recited in claim 8 wherein after said impregnation step, opposite side panes on said can are permanently compressed towards each other to compressionally and fixedly engage said capacitor element therebetween.

10. A method of assembling a capacitor having a capacitor element sealed in a metal can with leads projecting therefrom comprising:
(a) forming a convolute capacitor element having at least a pair of electrical leads extending therefrom
(b) placing short elastomer sleeves over said leads
(c) placing guide tubes over each lead and sleeve
(d) providing a can member having an open end and aperture defining protrusions extending from an opposite transverse end wall
(e) inserting said guide tubes in said apertures
(f) sliding said can along said tubes over said capacitor element and removing said tubes
(g) compressing said can open end in a straight line and sealing said end by welding
(h) compressing opposed side panels in said can to fixedly engaging and compressing said capacitor element
(i) introducing a dielectric liquid into said can through said protrusions to impregnate said capacitor element
(j) and sealing said can in liquid-tight relationship by forming a circumferential indentation about said protrusions to compressionally engage said elastomer material.

References Cited
FOREIGN PATENTS
470,935   1/1951   Canada.

DARRELL L. CLAY, *Primary Examiner.*

E. GOLDBERG, *Assistant Examiner.*